(12) United States Patent
Lee et al.

(10) Patent No.: US 11,581,602 B2
(45) Date of Patent: Feb. 14, 2023

(54) POUCH TYPE SECONDARY BATTERY AND METHOD FOR MANUFACTURING THE SAME

(71) Applicant: SK INNOVATION CO., LTD., Seoul (KR)

(72) Inventors: Jong Hyuk Lee, Daejeon (KR); Hee Gyoung Kang, Daejeon (KR); Dock Young Yoon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 156 days.

(21) Appl. No.: 16/429,823

(22) Filed: Jun. 3, 2019

(65) Prior Publication Data

US 2019/0372064 A1 Dec. 5, 2019

(30) Foreign Application Priority Data

Jun. 5, 2018 (KR) .................. 10-2018-0064644
Apr. 4, 2019 (KR) .................. 10-2019-0039800

(51) Int. Cl.
*H01M 50/172* (2021.01)
*H01M 50/183* (2021.01)
*H01M 50/531* (2021.01)
*H01M 50/10* (2021.01)
*H01M 10/04* (2006.01)

(52) U.S. Cl.
CPC ....... *H01M 50/172* (2021.01); *H01M 10/049* (2013.01); *H01M 50/10* (2021.01); *H01M 50/183* (2021.01); *H01M 50/531* (2021.01)

(58) Field of Classification Search
CPC .. H01M 10/647; H01M 50/172; H01M 50/10; H01M 50/183; H01M 50/531; H01M 10/049
See application file for complete search history.

(56) References Cited

U.S. PATENT DOCUMENTS

2012/0040235 A1* 2/2012 Cho ................... H01M 50/538
429/156
2014/0014419 A1 1/2014 Fujii et al.

FOREIGN PATENT DOCUMENTS

| CN | 103098256 A | 5/2013 |
| CN | 105428561 A | 3/2016 |
| EP | 2999023 A1 | 3/2016 |
| JP | 10-21890 | 1/1998 |
| JP | 2003-197168 | 7/2003 |
| KR | 10-2017-0030782 | 3/2017 |
| KR | 10-1818806 | 1/2018 |

(Continued)

OTHER PUBLICATIONS

Partial European search report issued by European Patent Office dated Nov. 8, 2019.

(Continued)

*Primary Examiner* — Cynthia H Kelly
*Assistant Examiner* — Jenna Shulman
(74) *Attorney, Agent, or Firm* — IP & T Group LLP

(57) ABSTRACT

The present invention provide a pouch type secondary battery and a method for manufacturing the same. More particularly, the present invention provides a pouch type secondary battery and a method for manufacturing the same, in which a pouch case is formed in a folding manner without being subjected to a forming process (press process), such that there is no limit in a length, and a thickness of an inner space of the pouch case is not limited.

7 Claims, 8 Drawing Sheets

(56) References Cited

FOREIGN PATENT DOCUMENTS

| WO | 2014007510 A1 | 1/2014 |
| WO | 2017/063879 A1 | 4/2017 |
| WO | 2018/048133 A1 | 3/2018 |

OTHER PUBLICATIONS

Extended European Search Report issued by the EPO dated Feb. 17, 2020.
Office Action for Chinese Patent Application No. 201910461693.7 issued by the Chinese Patent Office dated Aug. 3, 2022.

* cited by examiner

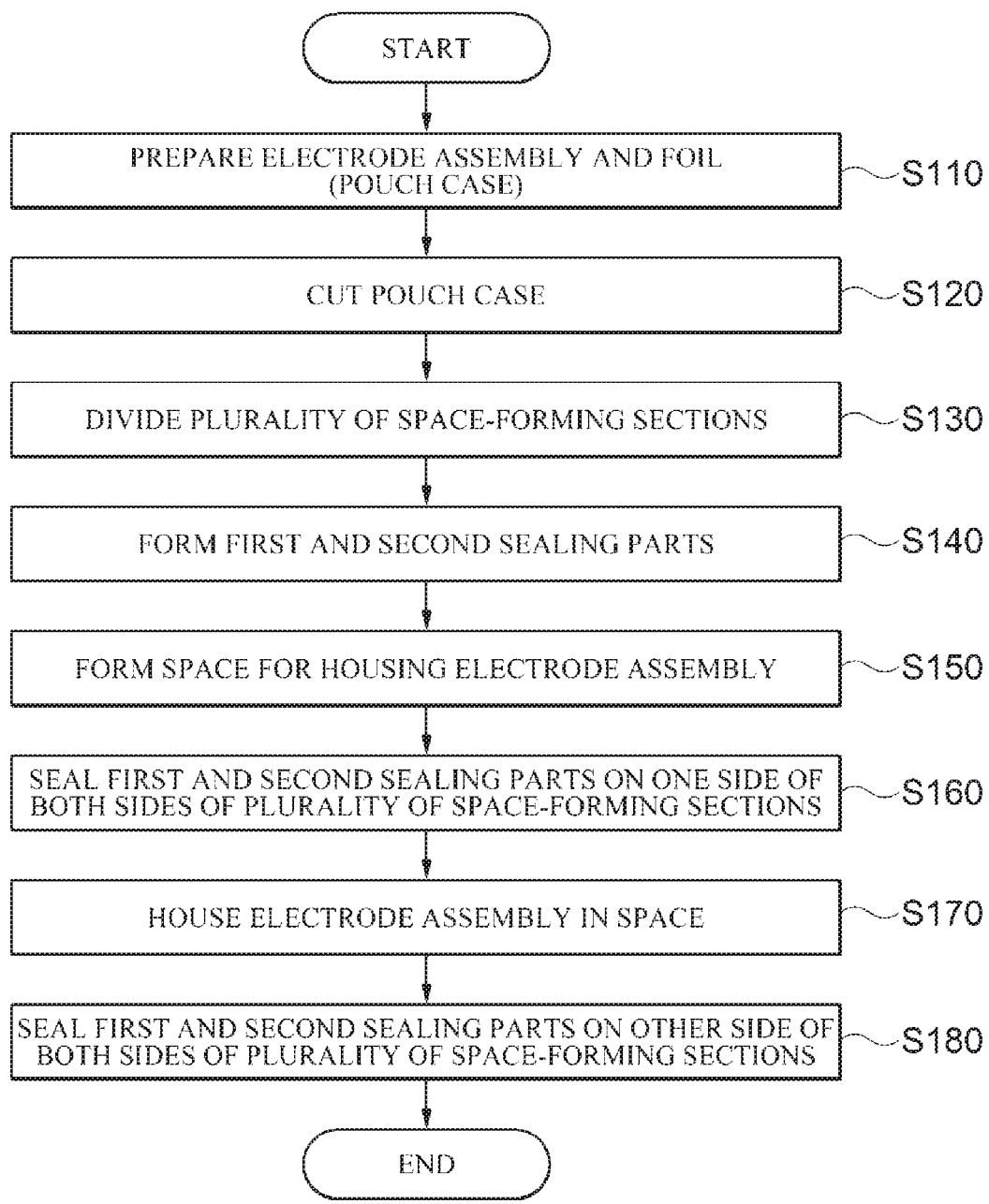

POUCH TYPE SECONDARY BATTERY AND METHOD FOR MANUFACTURING THE SAME

CROSS-REFERENCE TO RELATED APPLICATION

This application claims priority to Korean Patent Applications No. 10-2018-0064644 filed on Jun. 5, 2018 and Korean Patent Applications No. 10-2019-0039800 filed on Apr. 4, 2019 in the Korean Intellectual Property Office (KIPO), the entire disclosure of which is incorporated by reference herein.

BACKGROUND OF THE INVENTION

1. Field of the Invention

The present invention relates to a pouch type secondary battery and a method for manufacturing the same.

2. Description of the Related Art

In modern society, the demand for secondary batteries is rapidly increasing across the industry such as a mobile device or an automobile, and studies into the secondary battery are actively conducted. In general, a pouch is formed through a forming process (press process), that is, a process of forming a space in which an electrode assembly is housed by pressing a foil. After the electrode assembly (a jelly roll) is inserted into the inner space of the pouch molded through the above-described process, ends of the molded pouch is laminated to manufacture a battery.

In this case, while there are differences depending on a size and a thickness of the space to be housed, an aspect ratio of the foil, and/or molding conditions, defects such as a warpage phenomenon may occur. Therefore, when forming the pouch through the conventional process, the shape and size thereof may be limited due to mechanical and physical properties of a material.

In order for a product to stay competitive in a market economy, the product need to have a high quality and a low price, such that the need for a pouch type secondary battery having a high quality with reduced process costs is increasing.

As an example of the prior art, Korean Patent Registration No. 10-1818806, which is registered on Jan. 9, 2018, discloses a pouch type secondary battery and a method for manufacturing the same capable of effectively removing only the gas generated during a degassing process while preventing excessive leakage of electrolyte, however, still has lack of an improvement in a thickness of a cell and material costs.

SUMMARY OF THE INVENTION

It is an object of embodiments of the present invention to provide a pouch type secondary battery which is not subjected to a forming process, and a method for manufacturing the same.

In addition, another object of embodiments of the present invention is to provide a pouch type secondary battery in which a thickness of a cell formed of a pouch case is not limited, and a method for manufacturing the same.

Further, another object of embodiments of the present invention is to provide a secondary battery which may not be affected by mechanical characteristics of a pouch case by not accounting for a forming process, thereby reducing material costs of a pouch case.

To achieve the above-described objects, according to an aspect of the present invention, there is provided a pouch type secondary battery including: an electrode assembly; and a pouch case in which the electrode assembly is housed, wherein the pouch case comprises: a plurality of space-forming sections which are formed in a plane and connected to each other in parallel, and are configured to form a space for housing the electrode assembly by folding; and tab drawing sections configured to extend from the plurality of space-forming sections so that the electrode tabs of the electrode assembly are drawn out.

Herein, according to one embodiment of the present invention, the space may be formed by folding the space-forming sections along a plurality of imaginary lines formed in parallel to the pouch case.

Further, according to one embodiment of the present invention, the tab drawing sections may extend from the plurality of space-foiling sections in a direction perpendicular to a direction in which the plurality of space-forming sections are arranged.

Further, according to one embodiment of the present invention, the tab drawing section may include: a pair of first sealing part which are formed at respective ends of a pair of opposite space-forming sections among the plurality of space-forming sections, and are configured to from tab drawing parts for drawing out the electrode tabs; and a pair of second sealing parts which are formed at respective ends of a pair of opposite space-forming sections in which the pair of first sealing parts are not formed, and come into contact with the first sealing part to fix the first sealing part.

Further, according to one embodiment of the present invention, the pair of first sealing parts respectively may include a first sealing section to seal the space, and a tab support part which extends from one end of the first sealing section to support the electrode tab.

Further, according to one embodiment of the present invention, the space may have a rectangular parallelepiped shape.

Further, according to one embodiment of the present invention, the pair of second sealing parts may have at least one shape of rectangular and trapezoidal shapes.

Further, according to one embodiment of the present invention, the second sealing may have one side which is in contact with the tap drawing part and is folded.

Further, according to one embodiment of the present invention, the pair of second sealing parts may include: a second sealing section which seals a contact region between the pair of first sealing parts, and the space-forming sections in which the pair of second sealing parts are disposed; and a folding section which extends from the second sealing section and is configured to be folded from the second sealing section so as to prevent an interference with the tab drawing part.

Furthermore, according to one embodiment of the present invention, the space formed by the pouch case may have a thickness of 20 mm or more.

According to another aspect of the present invention, there is provided a method for manufacturing a pouch type secondary battery including: preparing an electrode assembly and a foil to form a pouch case; setting first imaginary lines parallel to the foil at a predetermined interval to define a plurality of space-forming sections; setting second imaginary lines perpendicular to the first imaginary lines on the foil to form first and second sealing parts which are alternately arranged at both ends of the plurality of space-forming sections; folding the plurality of space-forming sections on the basis of the first imaginary lines to form a space for housing the electrode assembly; sealing the first and second sealing parts on one side of both sides of the plurality of space-forming sections; housing the electrode assembly in the space; and sealing the first and second sealing parts on the other side of both sides of the plurality of space-forming sections.

Further, according to one embodiment of the present invention, the step of sealing the first and second sealing parts on both sides of the plurality of space-forming sections may include: folding the second sealing parts on the basis of the second imaginary lines so as to seal a contact region between the first sealing parts and the plurality of space-forming sections; and folding the first sealing parts on the basis of the second imaginary lines to form tab drawing parts from which electrode tabs of the electrode assembly are drawn out.

Further, according to one embodiment of the present invention, the first sealing parts respectively may include a sealing section which seals the space, and a tab support part which extends from one end of the sealing section to support the electrode tab.

Further, according to one embodiment of the present invention, the space may have a rectangular parallelepiped shape.

Further, according to one embodiment of the present invention, the second sealing parts may have at least one shape of rectangular and trapezoidal shapes.

Further, according to one embodiment of the present invention, the second sealing may have one side which is in contact with the tap drawing part and is folded.

Further, according to one embodiment of the present invention, the second sealing part may be folded at one side thereof so as to prevent an interference with the electrode tab drawn through the tab drawing part.

Further, according to one embodiment of the present invention, the space formed by the pouch case may have a thickness of 20 mm or more.

According to the embodiments of the present invention, since the pouch case is folded to form a cell, a pouch forming process for stretching or forming an aluminum film inside the pouch is not used, such that the material costs of the pouch case may be selected regardless of the mechanical characteristics to reduce manufacturing costs.

In addition, according to the embodiments of the present invention, the pouch case is folded to form a cell, such that a wasted portion thereof may be reduced to reduce the manufacturing costs.

Further, according to the embodiments of the present invention, since the forming process using a press is not used, the thickness of the formed cell may not be limited.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a flowchart illustrating a method for packing a pouch case of the pouch type secondary battery according to the embodiment of the present invention.

DETAILED DESCRIPTION OF THE INVENTION

Figure 1:
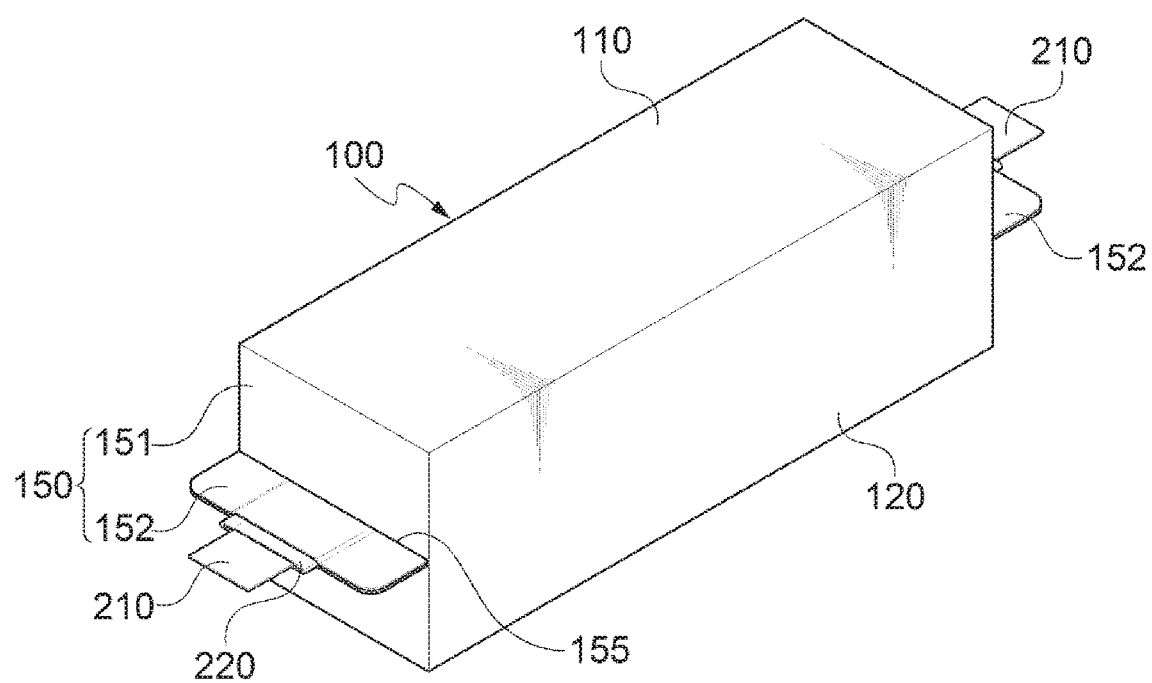
FIG. 1 is a perspective view of a pouch type secondary battery according to an embodiment of the present invention.

Hereinafter, specific embodiments of the present invention will be described with reference to the accompanying drawings. The following detailed description is provided to contribute to a comprehensive understanding of a method, apparatus, and/or system described herein. However, these embodiments merely illustrative examples, and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, it will be understood that, although the terms first, second, etc. may be used herein to describe various elements, components or sections, these elements, components or sections should not be limited by these terms. These terms are only used to distinguish one element, component or section from another element, component or section. Thus, a first element, component or section discussed below could be termed a second element, component or section without departing from the teachings of the present invention.

Furthermore, directional terms such as "one side," "the other side," "upper," "lower," and the like are used in connection with the orientation of the disclosed drawings. Since the components of the embodiments of the present invention may be located in various orientations, the directional terms are used for illustrative purposes, and are not intended to limit the present invention thereto.

FIG. 1 is a perspective view of a pouch type secondary battery according to an embodiment of the present invention. A pouch type secondary battery 10 according to the embodiment of the present invention may include a pouch case 100, an electrode assembly (not illustrated), an electrolyte (not illustrated) and electrode tabs 210.

The pouch case 100 will be described below.

The electrode assembly (not illustrated) may generally include an anode, a cathode, and a separator, and may be referred to as a jelly roll since it is wound in a form of a jelly roll. The electrode assembly (not illustrated) is housed in the pouch case 100 to perform charging and discharging. In addition, the electrode assembly (not illustrated) may supply or receive an electric current through the electrode tabs 210. The electrode tabs 210 may be drawn through the tab drawing parts 155 formed in the pouch case 100.

The electrolyte is injected into the pouch case 100 to be used. The electrolyte is generally an organic solvent which is stable at a high voltage, has a high ionic conductivity and a high permittivity while having a low viscosity. A performance of the secondary battery may depend on types and characteristics of the used electrolyte, but the types or characteristics of the electrolyte are not particularly limited in the embodiments of the present invention.

Figure 2A:
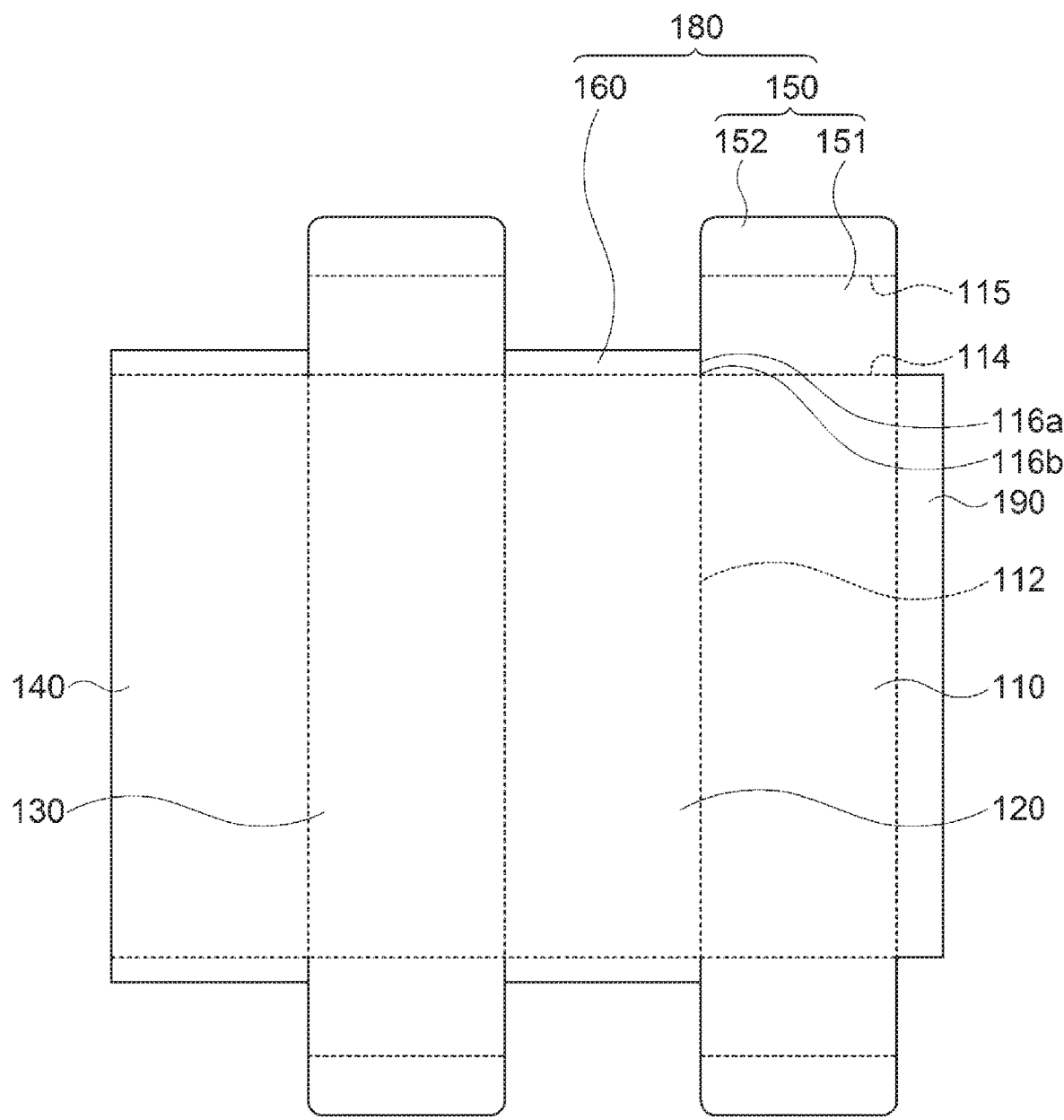
FIG. 2A is a development view illustrating a state in which second sealing parts are formed in a rectangular shape.
Figure 2B:
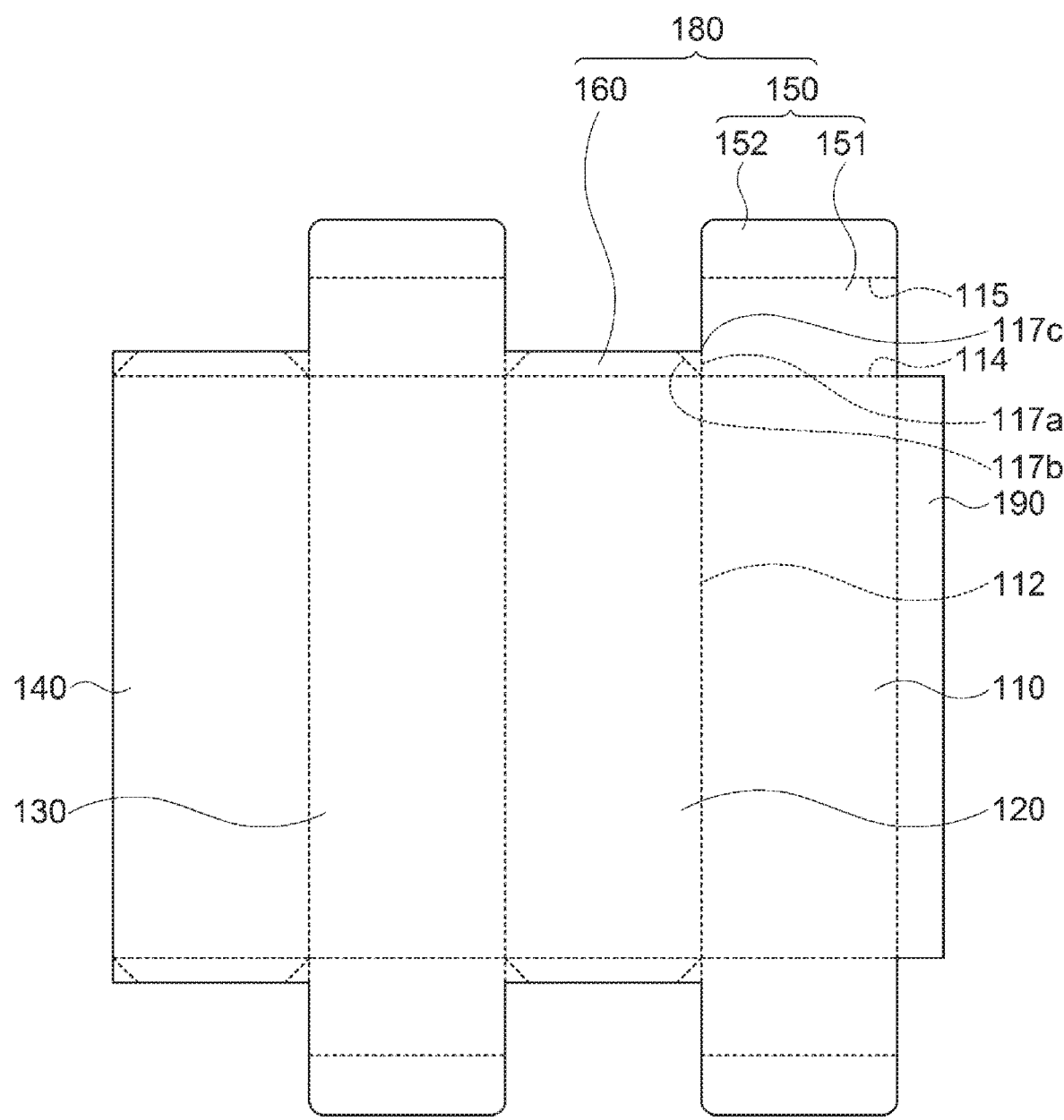
FIG. 2B is a development view illustrating a state in which the second sealing parts are formed a trapezoidal shape.
Figure 2C:
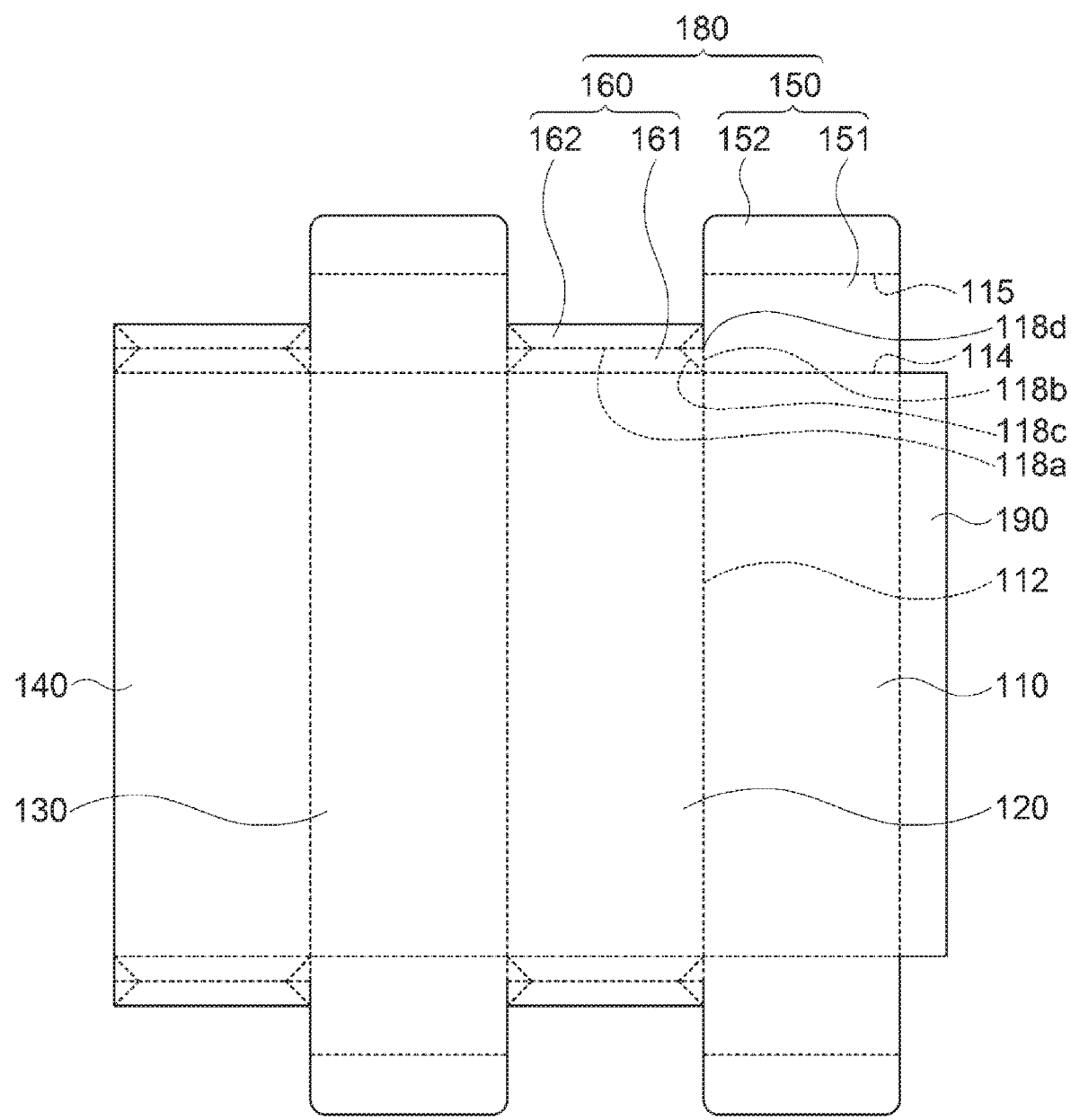
FIG. 2C is a development view illustrating a state in which the second sealing parts include second sealing sections and folding sections.

FIGS. 2A, 2B and 2C are development views of the pouch case of the pouch type secondary battery according to the embodiment of the present invention. Specifically, FIG. 2A is a development view illustrating a state in which second sealing parts are formed in a rectangular shape, FIG. 2B is a development view illustrating a state in which the second sealing parts are formed a trapezoidal shape, and FIG. 2C is a development view illustrating a state in which the second sealing parts include second sealing sections and folding sections.

Referring to FIGS. 2A and 2B, the pouch case 100 of the pouch type secondary battery 10 may include space-forming sections 110, 120, 130 and 140, and tab drawing sections 180. The pouch case 100 may be formed of a foil (not illustrated), and the foil may be in the form of a film including a metal layer such as aluminum and a resin layer.

The space-forming sections 110, 120, 130 and 140 may include a first section 110, a second section 120, a third section 130 and a fourth section 140. In addition, the space-forming sections 110, 120, 130 and 140 form a space in which the electrode assembly (not illustrated) can be housed when folding these sections along first imaginary lines 112 which will be described below. In the present disclosure, reference numerals are assigned in order from a right side as illustrated in FIG. 2, but these reference numerals are merely assigned for the convenience of description.

In addition, the space-forming sections 110, 120, 130 and 140, and the tab drawing sections 180 may be separately designated to divide regions of the pouch case 100 for the convenience, and may be portions formed in one pouch case 100. Accordingly, although the first section 110, the second section 120, the third section 130 and the fourth section 140 are illustrated as separate components, these sections may be divided into regions in the pouch case 100 formed as one piece.

Defining the space-forming sections 110, 120, 130 and 140 may be performed by arranging the first imaginary lines 112 parallel to the pouch case 100 and dividing these sections into the first section 110, the second section 120, the third section 130 and the fourth section 140. In this case, the first section 110 and the third section 130, and the second section 120 and the fourth section 140 may have the same size of the regions as each other. Of course, the sizes of the regions of the respective sections may be the same as each other.

When folding the first to fourth sections 110 to 140 to form a space, an adhesive section 190 disposed on one side of the first section 110 may be adhered to an inside or an outside of the fourth section 140. Thereby, a space which is formed by folding the respective sections may be maintained.

Further, second imaginary lines 114 are arranged at opposite ends of the space-forming sections 110, 120, 130 and 140, which are perpendicular to the first imaginary lines 112. Then, first sealing parts 150 and second sealing parts 160 may be formed using the second imaginary lines 114, which can foil the tab drawing sections 180 at opposite ends of the space-forming sections 110, 120, 130 and 140.

The tab drawing section 180 may include the first sealing part 150 and the second sealing part 160. The first and second sealing parts 150 and 160 may be configured so as to extend from the space-forming sections 110, 120, 130 and 140. The first and second sealing parts 150 and 160 may be alternately disposed along the ends of the space-forming sections 110, 120, 130 and 140. The tab drawing section 180 may extend from a plurality of space-forming sections 110, 120, 130 and 140 in a direction perpendicular to a direction in which the plurality of space-forming sections 110, 120, 130 and 140 are arranged.

The first sealing part 150 may serve to seal the ends of both sides of a space which may be formed by the space-forming sections 110, 120, 130 and 140. The first sealing part 150 may include a first sealing section 151 for separating the space from an outside, and a tab support part 152 which is bent outward of the space formed by the space-forming sections 110, 120, 130 and 140 to support the electrode tabs 210. The first sealing section 151 and the tab support part 152 may be divided by a are respectively folded from the plurality of space-forming sections 110, 120, 130 and 140 on the basis of the second imaginary lines 114.

Referring to FIG. 2B, a first bending line 117a may be located between the first sealing part 150 and the second sealing part 160. In addition, second bending lines 117b continued to the first bending lines 117a may be located so that the first and second sealing parts 150 and 160 can be folded on the basis of the second imaginary lines 114. The second bending lines 117b are located in the second sealing part 160, and are formed in an oblique direction so as to be continued to the first bending lines 117a.

With the above-described configuration, in the process of folding the first and second sealing parts 150 and 160 from the plurality of space-forming sections 110, 120, 130 and 140 on the basis of the second imaginary lines 114, sealing effects of the first and second sealing parts 150 and 160 may be increased. That is, in a case of FIG. 2A, the first and second sealing parts 150 and 160 are divided from the second imaginary lines 114 by the incision line 116a (see FIG. 2A), thereby, when the pouch case 100 is folded so as to form a space, division beginning points 116b (see FIG. 2A) are formed at intersections of the plurality of space-forming sections 110, 120, 130 and 140 and the first and second sealing parts 150 and 160, briefly, at vertexes. Specifically, the division beginning point 116b may be located at an end of the first sealing section 151 adjacent to the second sealing 160.

However, in a case of FIG. 2B, when the pouch case 100 is folded so as to form a space by the first and second bending lines 117a and 117b, the division beginning points 117c of the first and second sealing parts 150 and 160 will be located on upper and lower sides of the pouch case 100 spaced apart from the plurality of space-forming sections 110, 120, 130 and 140. Specifically, the segment start point 117c may be located at the inner surface of the first sealing section 151. With the above-described configuration, the sealing effects of the pouch case 100 may be enhanced.

Referring to FIG. 2C, the second sealing part 160 may include a second sealing section 161 for sealing the first sealing part 150 and a folding section 162 which can be folded inward of the space formed by the space-forming sections 110, 120, 130 and 140. The second sealing section 161 and the folding section 162 may be divided by a fourth imaginary line 118a. The folding section 162 may be configured so as to be folded from the second sealing section 161 along the fourth imaginary line 118a.

The first sealing part 150 and the second sealing part 160 may be formed symmetrically on both sides of each section.

Also referring to FIG. 2C, a first bending line 118b may be located between the first sealing part 150 and the second sealing part 160. In addition, second bending lines 118c continued to the first bending lines 118b may be located so that the first and second sealing parts 150 and 160 may be folded on the basis of the second imaginary lines 114. The second bending lines 118c are located in the second sealing part 160, and are formed in an oblique direction so as to be continued to the first bending lines 118b. In the embodiment of FIG. 2C, the folding section 162 will be folded on the basis of the bending lines 118b and 118c with being folded on the folding section 161 by the fourth imaginary line 118a. Therefore, the inclined directions of the second bending lines 118c may be symmetrically arranged on the basis of the fourth imaginary line 118a.

With the above-described configuration, in the process of folding the first and second sealing parts 150 and 160 from the plurality of space-forming sections 110, 120, 130 and 140 on the basis of the second imaginary lines 114, the sealing effects of the first and second sealing parts 150 and 160 may be enhanced. That is, in the case of FIG. 2A, the first and second sealing parts 150 and 160 are divided from the second imaginary lines 114 by the incision line 116a (see FIG. 2A), thereby, when the pouch case 100 is folded so as to form a space, the division beginning points 116b (see FIG. 2A) are formed at intersections of the plurality of space-forming sections 110, 120, 130 and 140 and the first and second sealing parts 150 and 160, briefly, at the vertexes. Specifically, the division beginning point 116b may be located at the end of the first sealing section 151 adjacent to the second sealing 160.

However, in a case of FIG. 2C, when the pouch case 100 is folded so as to form a space by the first and second bending lines 118b and 118c, division beginning points 118d of the first and second sealing parts 150 and 160 will be located on upper and lower sides of the pouch case 100 spaced apart from the plurality of space-forming sections. Specifically, the division beginning points 118d may be located at the inner surface of the first sealing section 151. With the above-described configuration, the sealing effects of the pouch case 100 may be enhanced. At the same time, the second sealing part 160 is folded by the folding section 162, thereby preventing the second sealing part from interfering with the electrode tab.

The incision line 116a, and the bending lines 117a, 117b, 118b and 118c which are described above in FIGS. 2A, 2B and 2C may be actually displayed on the pouch case 100, but these lines may be imaginary lines formed so that the pouch case 100 may form a space.

Figure 3:
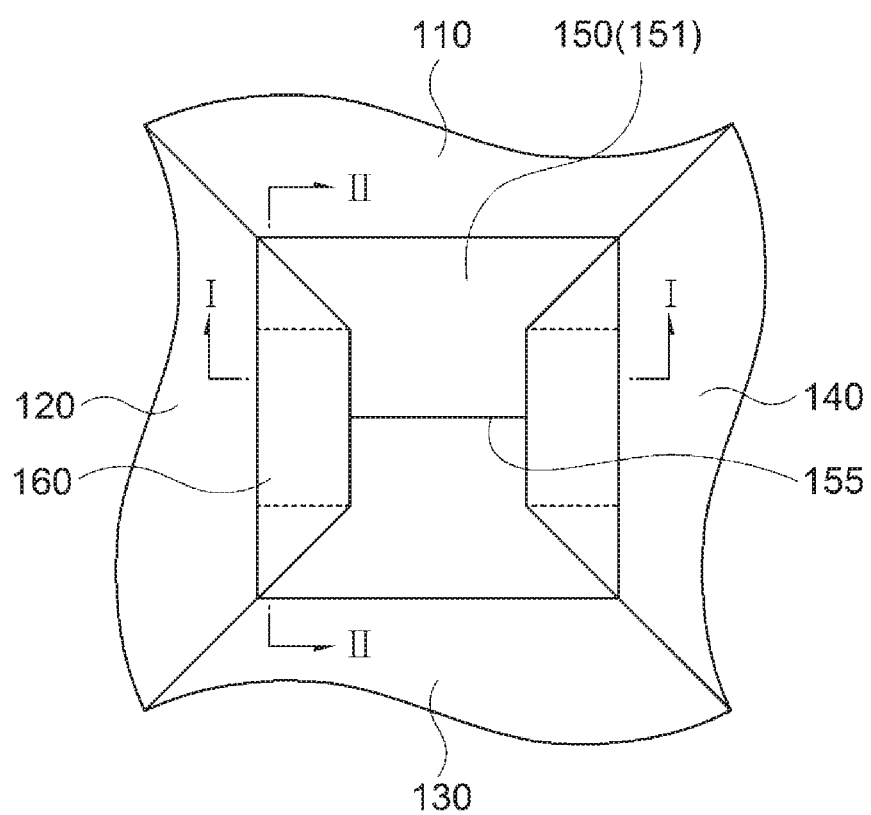
FIG. 3 is a view illustrating an inner side of the pouch type secondary battery according to the embodiment of the present invention.

FIG. 3 is a view illustrating an inner side of the pouch type secondary battery according to the embodiment of the present invention.

The first section 110 and the third section 130 may be disposed on the first sealing part 150 side, and the second section 120 and the fourth section 140 may be disposed on the second sealing part 160 side. The second sealing part 160 may seal a contact region between the first sealing part 150 and the second section 120, and a contact region between the first sealing part 150 and the fourth section 140.

The second sealing part 160 may have a rectangular or trapezoidal shape. If the second sealing part 160 has a rectangular shape, there is an advantage that it is easy to assemble. However, if the second sealing part 160 has a rectangular shape, opposite ends thereof may interfere with corners of the first sealing parts 150, such that the sealing may be incompletely performed. If the second sealing part 160 has a triangular shape, contact areas with the first sealing sections 151 are small, such that a fixing force may be weakened. Accordingly, when the second sealing part 160 is formed in a trapezoid shape, an area to be in contact with the first sealing sections 151 may be maximized, and thereby, the sealing may be completely performed due to the first sealing parts 150 during the folding process.

The pouch type secondary battery according to the embodiment of the present invention may be formed in a rectangular parallelepiped shape, and the tab drawing sections 180 may be formed on both sides thereof. Further, only the first sealing part 150 is formed so as to be visible when viewed from the outside.

The first sealing part 150 may serve to seal the space of the pouch case by the first sealing section 151, and support the electrode tab 210 by the tab support part 152 with being bent. In addition, the tab support part 152 may be bent to form the tab drawing part 155.

The pouch for a typical secondary battery has a limit in the length thereof, but according to one embodiment of the present invention, the pouch is formed in a manner of folding the pouch case 100, such that there is no limit in the length thereof.

Figure 4A:
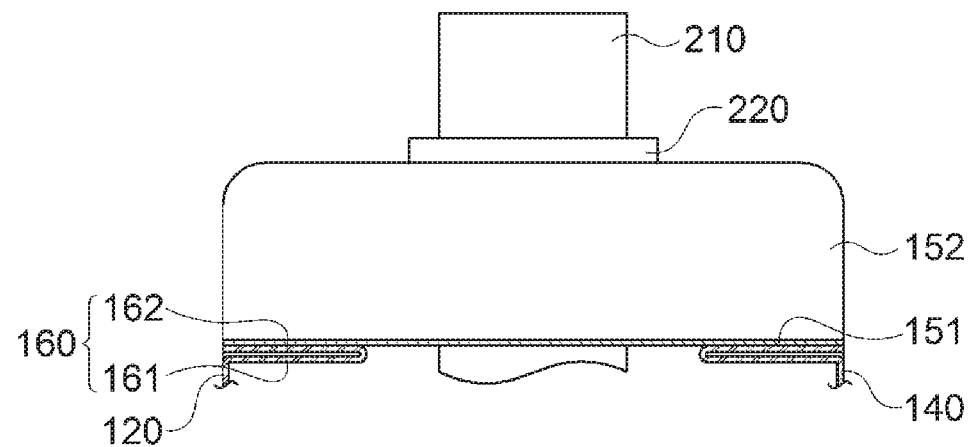
FIG. 4A is a cross-sectional view taken on line I-I of FIG. 3.
Figure 4B:
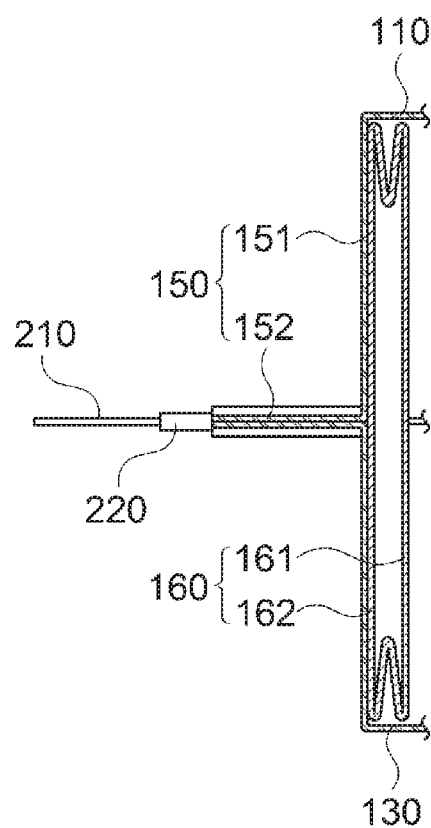
FIG. 4B is a cross-sectional view taken on line II-II of FIG. 3.

FIGS. 4A and 4B are cross-sectional views illustrating the tab drawing section 180 of the pouch case of the pouch type secondary battery according to the embodiment of the present invention. Specifically, FIG. 4A is a cross-sectional view taken on line I-I of FIG. 3, and FIG. 4B is a cross-sectional view taken on line II-II of FIG. 3. Referring to FIGS. 4A and 4B, the folding section 162 of the second sealing part 160 included in the tab drawing section 180 is illustrated in a state in which one side thereof capable of meeting the electrode tab 210 is folded. The reasons are as follows.

In the first sealing part 150, the first sealing sections 151 may abut each other to form the tab drawing part 155 as described above. The electrode tab 210 of the electrode assembly (not illustrated) may be drawn out from the tab drawing part 155. The foil may include a metal layer and a resin layer as described above, and generally, the foil may be formed in a form in which both sides of the metal layer are coated with the resin layer. Thus, the metal layer of the second sealing part 160 and the electrode tab 210 may abut each other, such that an unexpected situation may occur.

In addition, the pouch type secondary battery 10 may include a polymer 220 capable of sealing the tab drawing section 180 and the electrode tab 210. The polymer 220 may reduce a clearance generated when drawing out the electrode tab 210 from the tab drawing section 180, and may improve the fixing force of the electrode tab 210.

Therefore, an end of the folding section 162 may be folded inward of the space formed by the space-forming sections 110, 120, 130 and 140, so that the metal layer of the second sealing part 160 does not come into contact with the electrode tab 210. When the second sealing part 160 is folded inwardly, it is possible to prevent an occurrence of an unexpected situation in which the resin layer abuts the electrode tab 210, or the electrode tab 210 and the second sealing part 160 are spaced apart from each other, such that the electrode tab 210 and the metal layer of the second sealing part 160 come into contact with each other.

In addition, FIG. 4B is a cross-sectional view illustrating a state in which a portion corresponding to the fourth imaginary line 116 of FIG. 2C is folded, when folding the folding section 162. Specifically, the folding section 162 is folded along the fourth imaginary line 116 of FIG. 2C, then may be folded inward of the space formed by the space-forming sections 110, 120, 130 and 140. This may be to prevent the electrode tab 210 from unexpectedly coming into contact with the end of the second sealing part 160 as described above.

FIG. 5 is a flowchart illustrating a method for packing a pouch case of the pouch type secondary battery according to the embodiment of the present invention.

First, a method for manufacturing the pouch type secondary battery 10 according to the embodiment of the present invention will be described below.

A foil for forming the electrode assembly (not illustrated) and the pouch case 100 may be prepared (S110).

Then, the foil may be cut into an appropriate size to determine a size suitable for forming the pouch case 100 (S120).

The first imaginary lines 112 parallel to the foil at a predetermined interval may be set to divide the plurality of space-forming sections 110, 120, 130 and 140. That is, by setting the first imaginary lines 112 on the foil, the plurality of space-forming sections 110, 120, 130 and 140 may be formed so as to be divided (S130).

The second imaginary lines 114 perpendicular to the first imaginary lines 112 may be set on the foil to form the first and second sealing parts 150 and 160 which are alternately disposed at both ends of the plurality of space-forming sections 110, 120, 130 and 140 (S140). That is, by setting the second imaginary lines 114 perpendicular to the first imaginary lines 112, it is possible to form a pair of first sealing parts 150 to form the tab drawing parts 155 from which the electrode tabs 210 of the electrode assembly (not illustrated) can be drawn from the second imaginary lines 114 to the ends of the foils, and a pair of second sealing parts 160 for fixing the first sealing part 150 with being contact with the first sealing part 150. In addition, the adhesive section 190 for maintaining a space after forming the space may be formed on one side of the first section 110.

Next, the regions of the space-forming sections 110, 120, 130 and 140 may be folded to form a space for housing the electrode assembly (not illustrated) (S150). Once the space is formed, the space may be sealed by the adhesive section 190. The electrode assembly (not illustrated) may be housed in the space.

One side of opposite ends of the formed space may be sealed (S160). At this time, the sealing may be performed by forming the tab drawing part 155 by the first sealing part 150, and fixing the first sealing part 150 by the second sealing part 160. After the space is formed, one of the opposite ends of the space may be sealed by the second sealing part 160, while forming the tab drawing section 180 by the first sealing part 150.

After one side of the space is sealed, the electrode assembly (not illustrated) may be housed in the space (S170). As the electrode assembly (not illustrated) is housed in the space, the electrode tab may be drawn out through the tab drawing part, then the electrolyte may be injected. On the other hand, the electrode assembly is housed in the space and the electrolyte is injected, then the electrode tab 210 may be drawn out to the tab drawing part 155 of the tab drawing section 180.

When the electrode assembly (not illustrated) is housed in the space, the other side which is not sealed of opposite ends of the formed space may be sealed (S180). The second sealing part 160 on the other side which is not sealed of opposite ends of the space may be folded inward of the space. That is, the second sealing part 160 may be folded so as to face the electrode assembly (not illustrated). After the second sealing part 160 is folded, the first sealing part 150 may be folded. The first sealing part 150 may be folded to seal the space. The tab support part 152 may be bent outward of the space.

As a method for fixing the first sealing part 150 by the second sealing part 160, a method for thermal compression bonding or thermal fusion bonding may be used. Further, in order to prevent the electrode tab 210 and the metal layer of the second sealing part 160 from abutting each other, a method for folding one side in contact with the tab drawing part 155 may be used.

The preparation of the foil may mean that the foil including the metal layer and the resin layer is cut into the size desired by the user. In the present disclosure, the foil may correspond to a kind of a raw material forming the pouch case 100, and the expression "pouch case 100" may refer to a portion surrounding the electrode assembly (not illustrated), and may be used without distinguishing before or after the folding. When the pouch case 100 is folded to be a form capable of housing the electrode assembly (not illustrated), the pouch case 100 may be referred to as a pouch. However, the pouch will be collectively referred to as a pouch case 100 for the sake of clear understanding in the present disclosure.

For the reasons as described above, the foil may be a material before forming the pouch case 100, and may mean a state before forming the first sealing part 150 and the second sealing part 160 through the first imaginary line 112 and the second imaginary line 114.

It is possible to divide the plurality of space-forming sections 110, 120, 130 and 140 from each other by setting the first imaginary lines 112 parallel to the foil at a predetermined interval. The intervals therebetween may be determined so that the space-forming sections 110, 120, 130 and 140 may include the first section 110, the second section 120, the third section 130 and the fourth section 140 as described above.

Then, it is possible to set the second imaginary lines 114 perpendicular to the first imaginary lines 112. The first sealing part 150 and the second sealing part 160 may be formed from the second imaginary lines 114 to the ends of the foil. The first sealing part 150 and the second sealing part 160 may be formed at opposite ends of the foil in a symmetrical shape. However, if the direction in which the electrode tabs 210 are drawn out is the same, the two electrode tabs 210 may be drawn out to only one side, such that the first sealing part 150 and the second sealing part 160 may not be formed symmetrically. However, the first sealing part 150 may be formed on the first section 110 and the third section 130, and the second sealing part 160 may be formed on the second section 120 and the fourth section 140 while making a pair of sealing parts. The shapes and roles of the respective sealing parts have been described above, and therefore will not be described.

The pouch case 100 may be folded on the basis of the first imaginary line 112 to be formed in a rectangular parallelepiped shape. That is, the pouch case 100 may be formed so that the first section 110 and the third section 130 are parallel to each other and the second section 120 and the fourth section 140 are parallel to each other. The first to fourth sections 110 to 140 may form a space in which the electrode assembly (not illustrated) can be housed.

When forming a space by the first to fourth sections 110 to 140, the adhesive section 190 disposed on one side of the first section 110 may come into contact with one side of the fourth section 140, and the contact portion may be sealed to maintain the formed space. Herein, the contact portion may be inside or outside of the space formed by the space-forming sections 110, 120, 130 and 140.

In this case, the thickness of the formed space is not particularly limited, but it may be 20 mm or more. When considering that it is difficult to form a space having a thickness of 20 mm or more by the pouch forming process due to characteristics of a thin foil, there is an advantage that the electrode assembly (not illustrated) having a capacity larger than that of the typical pouch type secondary battery 10 may be housed therein. Therefore, it is possible to form a large space having a thickness of preferably 25 mm or more, and more preferably 30 mm or more. As a result, the energy density of the secondary battery may be increased, and flexibility in selection of a design may be higher than the conventional case.

While the present invention has been particularly illustrated and described with reference to exemplary embodiments thereof, it is to be understood that the invention is not limited to the disclosed exemplary embodiments, but, on the contrary. Therefore, the scope of the present invention should not be limited to the above-described embodiments, but should be determined by equivalents to the appended claims, as well as the appended claims.

DESCRIPTION OF REFERENCE NUMERALS

10: Pouch type secondary battery
50: Foil
100: Pouch case
110: First section of space-foiling section
120: Second section of space-forming section
130: Third section of space-foiling section
140: Fourth section of space-forming section
150: First sealing part
151: First sealing section
152: Tab support part
155: Tab drawing part
160: Second sealing part
161: Second sealing section
162: Folding section
180: Tab drawing section
190: Adhesive section
210: Electrode tab
220: Polymer

What is claimed is:

1. A pouch type secondary battery comprising:
a pouch case in which an electrode assembly is housed, wherein the pouch case comprises:
a plurality of space-forming sections which are formed in a plane and connected to each other in parallel, and are folded to form a space for housing the electrode assembly; and
tab drawing sections which extend from the plurality of space-forming sections such that electrode tabs of the electrode assembly are drawn out,
wherein the tab drawing section comprises:
a pair of first sealing parts which are formed at respective ends of a pair of opposite space-forming sections among the plurality of space-forming sections, and form tab drawing parts for drawing out the electrode tabs; and
a pair of second sealing parts which are formed at respective ends of a pair of opposite space-forming sections in which the pair of first sealing parts are not formed, and come into contact with the first sealing part in the space to fix the first sealing part,
wherein the pair of second sealing parts have a trapezoidal shape, and a length of the second sealing part is less than that of the first sealing part.

2. The pouch type secondary battery according to claim 1, wherein the space is formed by the space-forming sections being folded along a plurality of imaginary lines formed in parallel to the pouch case.

3. The pouch type secondary battery according to claim 1, wherein the tab drawing sections extend from the plurality of space-forming sections in a direction perpendicular to a direction in which the plurality of space-forming sections are arranged.

4. The pouch type secondary battery according to claim 1, wherein the pair of first sealing parts respectively comprise a first sealing section adapted to seal the space, and a tab support part which extends from one end of the first sealing section to support the electrode tab.

5. The pouch type secondary battery according to claim 1, wherein the space has a rectangular parallelepiped shape.

6. The pouch type secondary battery according to claim 1, wherein the pair of second sealing parts comprise:
a second sealing section which is adapted to seal a contact region between the pair of first sealing parts, and the space-forming sections in which the pair of second sealing parts are disposed; and
a folding section which extends from the second sealing section and is folded from the second sealing section to prevent an interference with the tab drawing part.

7. The pouch type secondary battery according to claim 1, wherein the space formed by the pouch case has a thickness of 20 mm or more.

* * * * *